(12) United States Patent
Pallakoff

(10) Patent No.: US 6,269,343 B1
(45) Date of Patent: Jul. 31, 2001

(54) ON-LINE MARKETING SYSTEM AND METHOD

(75) Inventor: Matthew G. Pallakoff, Mountain View, CA (US)

(73) Assignee: MobShop, Inc., San Francisco, CA (US)

(*) Notice: Subject to any disclaimer, the term of this patent is extended or adjusted under 35 U.S.C. 154(b) by 0 days.

(21) Appl. No.: 09/376,884

(22) Filed: Aug. 18, 1999

Related U.S. Application Data

(60) Provisional application No. 60/097,932, filed on Aug. 25, 1998, and provisional application No. 60/097,933, filed on Aug. 25, 1998.

(51) Int. Cl.$^7$ .................................................. G06F 17/60
(52) U.S. Cl. ................................................. 705/26; 705/37
(58) Field of Search ................................. 705/26, 4, 28, 705/37, 39, 1; 380/4, 25

(56) References Cited

U.S. PATENT DOCUMENTS

| 3,581,072 | 5/1971 | Nymeyer | 235/152 |
|---|---|---|---|
| 4,567,359 | 1/1986 | Lockwood | 235/381 |

(List continued on next page.)

FOREIGN PATENT DOCUMENTS

0845747 * 6/1998 (EP).

OTHER PUBLICATIONS

"Christmas Wishes 1991;" Current Catalog; 1991.*
"About ONSALE;" ONSALE; 1996.*
"ONSALE Home;" ONSALE; Sep. 8, 1997.*

Lai, Rajiv; Staelin, Richard; "An Approach for Developing an Optimal Discount Pricing Policy;" Management Science, vol. 30, N 12, #1524, Dec. 1984.*

Sairamesh et al.; "Economic Framework for pricing and Charging in Digital Libraries;" D–Lab Magazine, ISSN 1082–9873, Feb. 1996.*

Marrinucci, Sandra; "Net proves a boon to research;" Electronic Engineering Times, Sep. 22, 1997.*

Bailey et al; "A Exploratory Study of the Emerging Role of Electronic Intermediaries;" International Journal of Electronic Commerce, vol. 1, n 3, p. 7–20, Spring 1997.*

(List continued on next page.)

Primary Examiner—Eric Stamber
(74) Attorney, Agent, or Firm—Lee & Hayes, PLLC

(57) ABSTRACT

The present invention provides a method and system that allows sellers to communicate conditional offers to potential buyers. The conditions include prices that depend on the aggregate amount of goods or services that buyers collectively agree to purchase by a given time and date. The invention facilitates "demand aggregation", that is, aggregating demand by potential buyers (who may or may not know each other), for products offered by sellers. This invention allows sellers conveniently to offer "Demand-Based Pricing", that is, prices which go down as the volume of units sold in any given offer goes up. A seller can therefor offer volume discounts to buyers acting as a group, even when the buyers may not have any formal relationship with one another.

11 Claims, 9 Drawing Sheets

U.S. PATENT DOCUMENTS

| | | | |
|---|---|---|---|
| 4,789,928 | 12/1988 | Fujisaki | 364/401 |
| 4,949,248 | 8/1990 | Caro | 364/200 |
| 5,136,501 * | 8/1992 | Silverman et al. | 705/37 |
| 5,148,365 | 9/1992 | Dembo | 364/402 |
| 5,255,184 | 10/1993 | Hornick et al. | 364/407 |
| 5,270,921 | 12/1993 | Hornick | 364/407 |
| 5,285,383 * | 2/1994 | Lindsey et al. | 705/26 |
| 5,297,031 * | 3/1994 | Gutterman et al. | 705/37 |
| 5,377,095 | 12/1994 | Maeda et al. | 364/401 |
| 5,576,951 | 11/1996 | Lockwood | 395/227 |
| 5,615,109 * | 3/1997 | Eder | 705/8 |
| 5,640,569 | 6/1997 | Miller et al. | 395/729 |
| 5,712,985 | 1/1998 | Lee et al. | 395/207 |
| 5,724,521 | 3/1998 | Dedrick | 395/226 |
| 5,727,165 | 3/1998 | Ordish | 395/237 |
| 5,729,700 | 3/1998 | Melnikoff | 395/236 |
| 5,745,882 | 4/1998 | Bixler | 705/26 |
| 5,757,917 * | 5/1998 | Rose et al. | 380/25 |
| 5,758,327 | 5/1998 | Gardner | 705/26 |
| 5,758,328 | 5/1998 | Giovannoli | 705/26 |
| 5,765,143 | 6/1998 | Sheldon et al. | 705/28 |
| 5,794,207 * | 8/1998 | Walker et al. | 705/1 |
| 5,794,219 | 8/1998 | Brown | 705/37 |
| 5,797,127 | 8/1998 | Walker et al. | 705/5 |
| 5,799,284 * | 8/1998 | Bourquin | 705/26 |
| 5,806,047 | 9/1998 | Hackel et al. | 705/36 |
| 5,809,144 | 9/1998 | Sirbu et al. | 380/25 |
| 5,819,914 | 10/1998 | Yoneyama | 200/344 |
| 5,826,244 | 10/1998 | Huberman | 705/37 |
| 5,832,489 | 11/1998 | Kucala | 707/10 |
| 5,835,896 * | 11/1998 | Fisher et al. | 705/37 |
| 5,842,178 | 11/1998 | Giovannoli | 705/26 |
| 5,845,265 | 12/1998 | Woolston | 705/37 |
| 5,845,266 | 12/1998 | Lupien et al. | 705/37 |
| 5,890,137 * | 3/1999 | Koreeda | 705/26 |
| 5,890,138 | 3/1999 | Godin et al. | 705/26 |
| 5,893,076 * | 4/1999 | Hafner et al. | 705/28 |
| 5,895,454 | 4/1999 | Harrington | 705/26 |
| 5,913,210 * | 6/1999 | Call | 707/4 |
| 5,949,876 * | 9/1999 | Ginter et al. | 380/4 |
| 5,956,709 | 9/1999 | Xue | 707/3 |
| 5,983,199 | 11/1999 | Kaneko | 705/26 |

OTHER PUBLICATIONS

Negromante, Nicholas; "Psst! Transactions;" Forbes, 80th Issue, Jul. 7, 1997.*

Ferranti, Marc; "Electronic Commerce: Ties That Bind;" InfoWorld, vol. 19, N 14, p. 59–62, Apr. 7, 1997.*

"Retail Ferderation Group Buying Set," HDF–The weekly Home Furnishings Newspaper, v0, n0, p. 9, Dec. 26, 1994.*

"Frontier Rings Up aA Sale With National Retail Federation," PR Newswire, p119NYM057, Jan. 19, 1998.*

"NRF: home page on World Wide Web (National Foundation Launches Site)," The Weekly Newspaper for the Home Furnishing Network, v70, N 42, p. 10(1), Oct. 14, 1996.*

"Retail Federation Group Buying Set," HDF–The Weekly Home Furnishings Newspaper, v68, N 52, p. 9(1), Dec. 26, 1994.*

"Mosher views ARA as survival kit for small specialty stores," Daily News Record, v24, N 22, p. 4(1), Feb. 2, 1994.*

"Kmart Targets GE as EDI Provider Signals GE's Re–Commitment to EDI," EDI News, v11, N 21, Oct. 13, 1997.*

"National Federation Selects GE Information Services for EDI Service Partnership," PR Newswire, p1006DCM009, Oct. 6, 1997.*

"New Entry Fuels Discount Retail," Marketing Week, Michael Cavanaugh, v22n33, p. 47, Sep. 16, 1999.*

New Twist to Online Shopping Service Hopes to Break Customer Apathy, Internet Week, vol. 1, No. 7, May 22, 1995, 3 pages.

Minkoff, Jerry, New Tricks in Pet Supplies, Discount Merchandiser, vol. 34, No. 12, pp. 70–72, Dec. 1994.

Finerman, Aaron, Management Data Processing, Association for Computing Machinery, pp. 381–382, Dec. 1, 1965.

Finerman, Aaron, Management Science, Association for Computing Machinery, 1990, 3 pages.

Goodman, Gail, Distribution Resource Planning, Hewlett–Packard, Apr. 14, 1995, 2 pages.

Personal Optimized Decision/Transaction Program, IBM Technical Disclosure Bulletin, pp. 83–84, Jan. 1995.

Going, Going, Gone! A Survey of Auction Types, Agorics, Inc., 1996 (includes subsections: "Auction Types–English", "Auction Type–Dutch", "Auctions–First–Price, Sealed Bid (Discriminatory)", Auctions–The Vickrey Auction, "The Double Auction", "Auction Offshoots", "Auction Strategies", "Auction History", "Government Securities–the Scandal of '91", "Collusion and Tricks", and "Bibliography"), 42 pages.

Web pages from Franklin Regional Council of Governments, Cooperative Bidding and Purchasing, unknown date, Greenfield, Mass., 4 pages.

Web Page from Klik–Klok Productions, About the Klik–Klok Dutch Auction, unknown date, 2 pages.

Multi–Product Delivery System Optimization Procedure, IBM Technical Disclosure Bulletin, vol. 38, No. 4, pp. 501–503, Apr. 1995.

Pant, Somendra and Hsu, Cheng, Fifth International World Wide Web Conference, Business on the Web: Strategies and Economics, May 6–10, 1996, Paris, France, 11 pages.

Rockoff, Todd and Groves, Michael, Design of an Internet-–based System for Remote Dutch Auctions, Internet Research: Electronic Networking Applications and Policy, vol. 5, No. 4, pp. 10–16, 1995.

"Scans" Section, Wired, pp. 51,54,56,58, Sep. 1995.

Review of: "The Airline Discount Fare Allocation Problem, Decision Sciences, pp. 149–157, 1989", date of review unknown, 2 pages.

Hutchinson, Art, E–Commerce: Building a Model, Communications Week, Mar. 17, 1997, 4 pages.

Web Retailers Band Together to Build Traffic and Sales, M2 Communications Ltd., Feb. 25, 1997, 2 pages.

Berryman, Kenneth et al., Electronic Commerce: three emerging strategies, McKinsey Quarterly, pp. 152–159, 1998.

Web Pages from TPN Marketplace, unknown date, 5 pages.

* cited by examiner

US 6,269,343 B1

ON-LINE MARKETING SYSTEM AND METHOD

This application is a continuation in part of co-pending application Ser. No. 60/097,932 which has a filing date of Aug. 25, 1998 and co-pending application Ser. No. 60/097,933 which has a filing date of Aug. 25, 1998.

FIELD OF THE INVENTION

The invention relates to electronic commerce utilizing the internet and more particularly to a method and system for marketing products and services utilizing the internet.

BACKGROUND

The world Wide Web has provided a convenient mechanism for marketing products. Many web sites offer products for sale. Generally a potential customer viewing such a web site indicates a desire to buy a particular product by "clicking" on a particular location on the display screen. Some sites require a user to "register" by giving a name, address and credit card information. Later when a customer desires to buy a product the information entered during registration is used for billing and shipping. Other sites allow a customer to enter billing and shipping information after the customer has indicated a desire to purchase a particular product.

Some web sites allow a buyer to bid on products that are offered in the internet's equivalent of an auction. Other web sites allow a user to made an offer to buy products at a price specified by the buyer, much as an individual might make an offer to buy a product at a particular price in a face to face situation.

Web sites such as those described above in essence utilize the internet to automate a conventional buying process. The process takes place at great speed and the parties may be remote, but the fundamental transaction is conventional.

The present invention provides a new paradigm for conducting a marketing transaction. Quantity pricing is conventional. However, in a conventional quantity pricing situation, one buyer is offered a series of prices depending upon the number of products purchased. The present invention utilizes the idea of quantity pricing in a new way. The present invention utilizes the internet to aggregate potentially unrelated and potentially totally independent buyers into a buying group. By aggregating the buyers, each buyer receives the advantage of quantity pricing.

SUMMARY OF THE INVENTION

The present invention provides a marketing method and system that aggregates demand and provides demand based pricing. With the present invention sellers can communicate conditional offers to potential buyers. The conditions include prices that depend on the amount of goods or services that buyers collectively agree to purchase by a given time and date. The invention facilitates "demand aggregation", that is, aggregating demand by potential buyers (who may or may not know each other), for products offered by sellers. This invention allows sellers to conveniently offer "Demand-Based Pricing", that is, prices which go down as the volume of units sold in any given offer goes up. A seller can therefor offer volume discounts to buyers acting as a group, even when the buyers may not have any formal relationship with one another.

DESCRIPTION OF PREFERRED EMBODIMENTS

As used herein the following terms have the meaning given below:

"Product" —means either a product or service.

"Demand Aggregation" —means consolidating demand by potential buyers for products offered by sellers.

"Demand-Based Pricing" —means prices that go down as the volume of units sold goes up.

"Buying Team" or "Buying Group" —means a group of buyers who participate in a given offer.

"Team Buying" or "Group Buying" —means multiple buyers coming together in a group to buy products in volume, "Aggregate Demand" —means the total amount of products that buyers have indicated a desire to buy.

"Demand Threshold" or"Aggregate Demand Threshold" —means the Aggregate Demand required for a product to be sold at a particular price.

"Maximum Demand Threshold" or "Maximum Aggregate Demand Threshold" —means the Demand Threshold above which the price will not decrease further, irrespective of further increases in Aggregate Demand.

"Buying Cycle" —means the period during which buyers can indicate a desire to purchase a product. At the end of a buying cycle, the demand is aggregated (counted) to determine the price at which the product is actually sold.

"Maximum Available Amount" —means the maximum amount of a product that a seller is willing to sell during a Buying Cycle.

"System Operator" —means an individual, company, party, entrepreneur or other entity that operates or is responsible for the computer system or web server that performs various calculations and operations hereinafter described.

Figure 1:
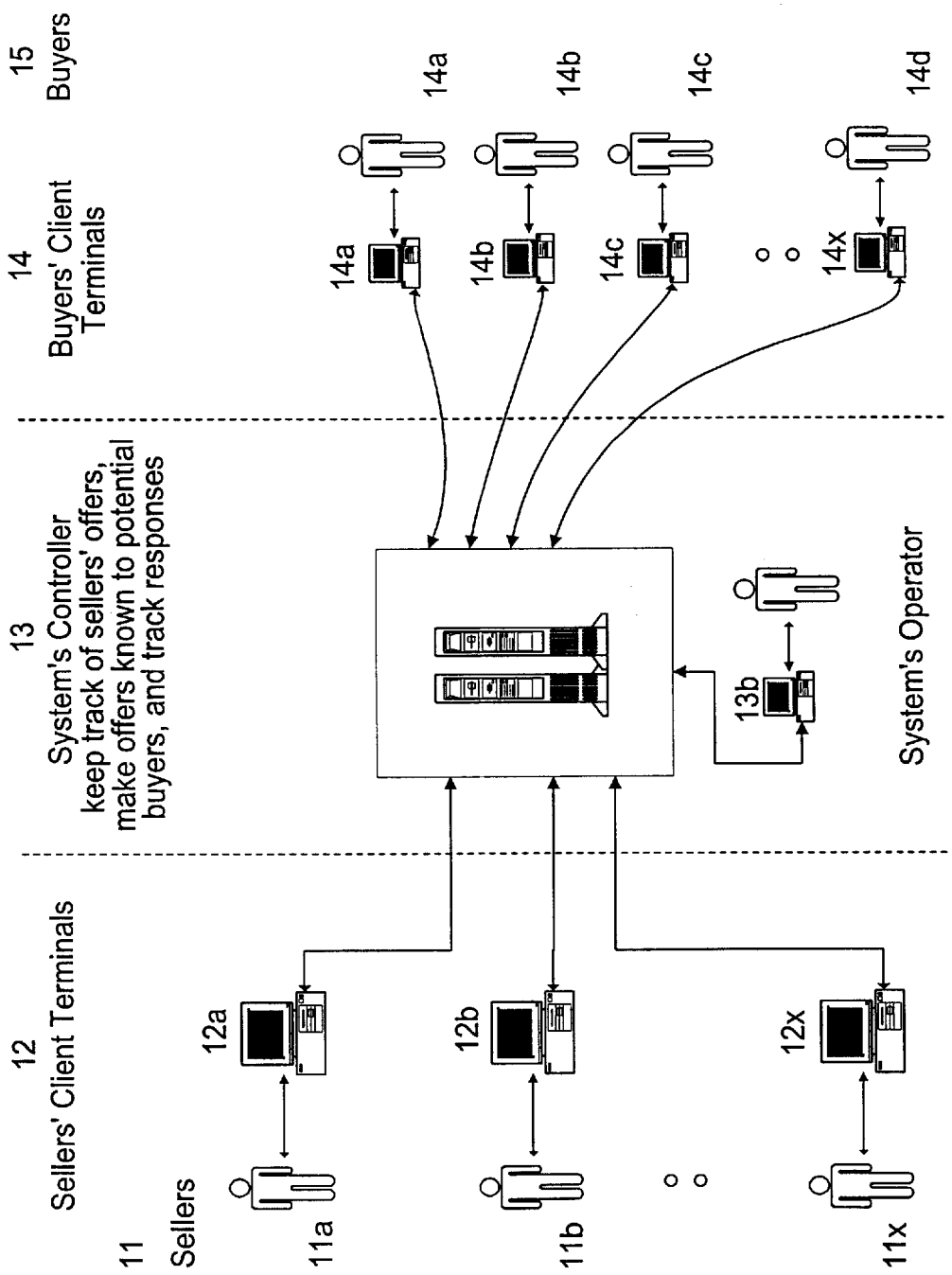
FIG. 1 is an overall diagram of the system.

An overall diagram of a first preferred embodiment of the invention is shown in FIG. 1. In general, the system connects sellers 11 with buyers 15 by means of a system controller 13. The sellers are designated 11a to 11x and are collectively referred to as sellers 11. The buyers are designated 15a to 15x and are collectively referred to as buyers 15. There can be many buyers and many sellers; however, the actual numbers of buyers and sellers is not relevant so long as there is at least one seller and one buyer.

The sellers 11 communicate with the controller 13 via terminals 12 (individually designated 12a to 12x) and the buyers 15 communicate with the controller 13 via terminals 14 (individually designated 14a to 14x). Typically but not necessarily communication is via the Internet. As is conventional, terminals 12 and 14 are connected to an ISP (Internet Service Provider) which provides access to the internet. Likewise controller 13 is connected to the internet via an ISP. The lines in FIG. 1 therefore represent logical information flow and not physical connections. The sellers 11 and the buyers 14 can be described as being online.

Sellers' client terminals 14 can be any of the various types of terminals that are available such as computers, laptops, thin-clients, WebTVs, Interactive TVs, PDAs, Information Appliances, or any other device that can be used by sellers to access the system's controller 13 over a network, so sellers can specify offers of goods and services The system controller 13 is one or more conventional network servers running software to keep track of sellers' offers (including optional conditions); "intelligently" control appearance of the offers on one or more physical or "virtual" media (e.g. web sites); and appropriately track and/or process purchase requests by buyers who may see and respond to those offers.

The System Operator 13b utilizes a conventional client terminal to access and configure the system's controller 13 as is conventional with computer systems and network servers.

The buyers' client terminals 14 are any of the various conventional terminals that are used to access web sites such as computers, laptops, thin-clients, WebTVs, two-way TV, PDAs, information appliances, or any other devices that buyers can use to view or hear offers presented by controller 13. Buyers also respond to offers using client terminals 14.

Figure 2:
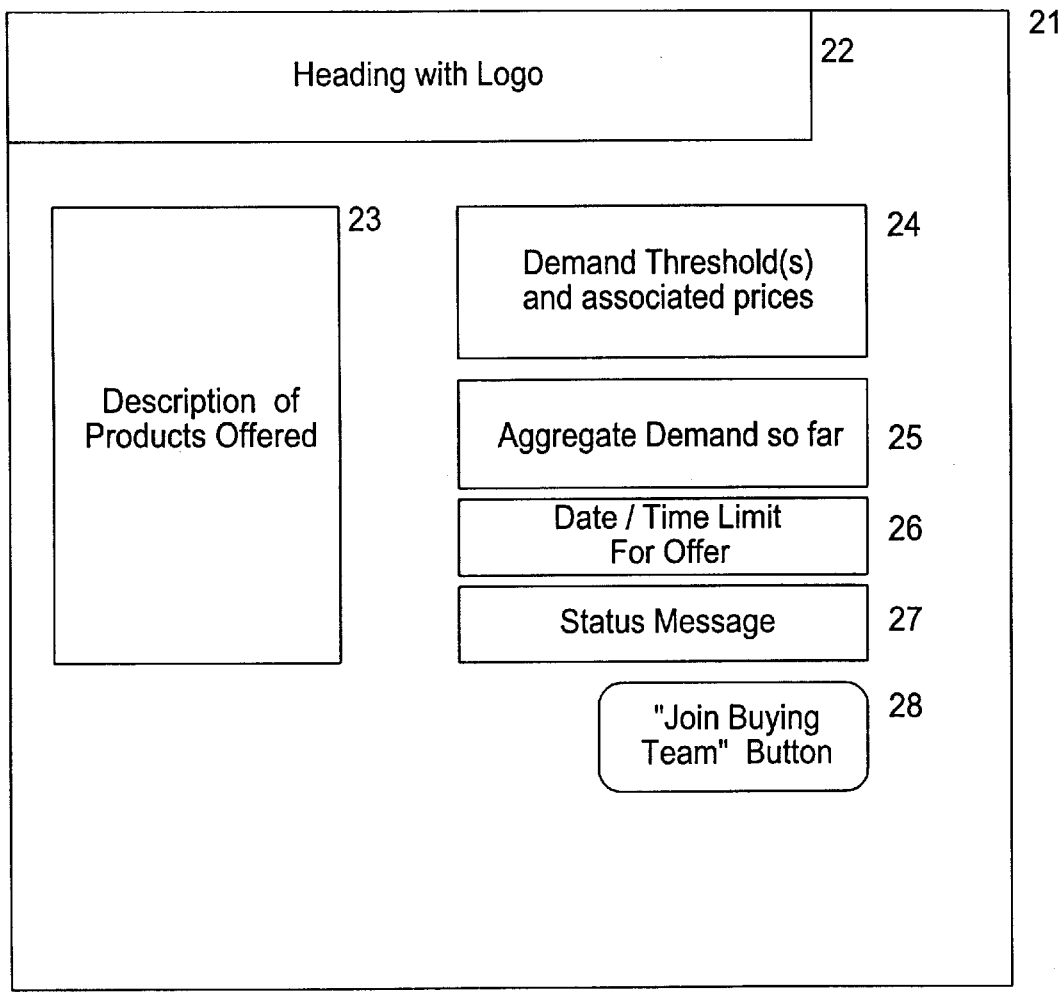
FIG. 2 illustrates the elements on a web page for the preferred embodiment.

FIG. 2 is a diagram illustrating the elements on a web page 21 which the controller 13 presents to buyers 15. It is noted that FIG. 2 merely illustrates the fields that are relevant to a preferred embodiment of the invention. FIG. 2 is not meant to illustrate the actual layout of a web page. An actual web page would be laid out in a creative, artistic fashion so as to present a pleasing visual appearance. The artistic nature of the visual appearance of the web page is not relevant to the present invention.

The fields or elements on web page 21 are:
a) A conventional heading and logo 22 may be included to identify who is sponsoring the web page, however, such a field is not actually necessary to the operation of the system.
b) A field 23 which describes the product being offered for sale.
c) A field 24 which lists the price of the product at various demand levels. For example, this field might indicate:
   2 to 5—$10.00
   6 to 20—$8.00
   21 or more—$4.00
In this example, the Demand Thresholds are 2, 6, and 21. The lowest Demand Threshold is 2, meaning that the offer will be cancelled unless at least two units are sold. The Maximum Demand Threshold is 21, meaning that the price will not drop any lower than $4.00 in this offer. The price will drop to $4.00 only when buyers order, in aggregate, at least 21 units during the buying cycle.
   This field can also specify a Maximum Available Amount. For Example, if the seller wanted to sell a maximum of 50 units (perhaps because only 50 items were in the seller's inventory), then the quantities and price could be specified as:
   2 to 5—$10.00
   6 to 20—$8.00
   21 to 50—$4.00
In this example, the Maximum Available Amount is 50.
d) A field 25 which indicates the Aggregate Demand so far for this offer, that is, the total amount of the offered product that interested buyers have collectively indicated a desire to buy. Optionally this field may also indicate how many individual buyers have thus far indicted a desire to buy the product. And this field may also optionally indicate the Maximum Available Amount level for this offer.
e) A field 26 which indicates the date and time when the buying process or cycle will terminate.
f) A field 27 for various status messages.
g) A button 28 on which a user can "click" to indicate a desire to join the buying process.

Web page 21 as described above relates to selling a single product. It should be noted that a single web page could offer multiple products. The fields described above could be repeated, one set of fields for each product, or each field could have information on multiple products. Furthermore, in addition to having the fields described above the web page 21 could include numerous other unrelated fields with other unrelated information or advertisements.

Figure 3:
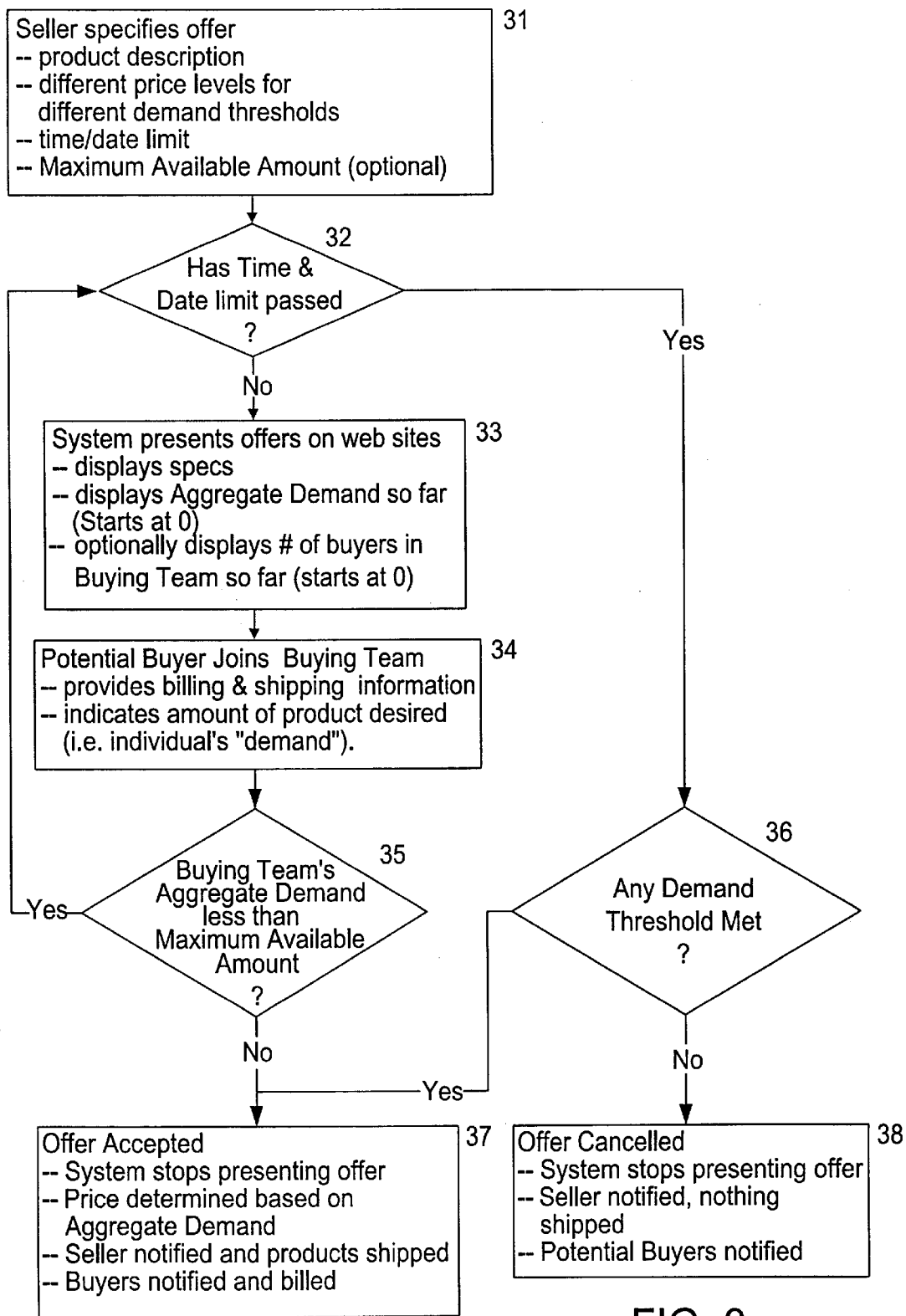
FIG. 3 is a high level flow diagram of the various operations that take place.

FIGS. 3 is an overall flow diagram of the operation of the system. The process begins with a seller making an offer to sell a particular product at specified prices which depend upon the amount of the product that can be sold in a particular time period (block 31). For example, a seller might indicate that he would sell a particular type of soccer ball at the following prices:
   2 to 5 balls—$10.00
   6 to 20 balls—$8.00
   21 to 50 balls—$4.00

In this example, the Demand Thresholds are 2, 6, and 21, the Maximum Demand Threshold is 21, and the Maximum Available Amount is 50. The seller specifies all of the above values. It is noted that the seller may choose not to specify a Maximum Available Amount. If no Maximum Available Amount is specified then the last line in the above example would read: "21 or more balls—$4.00".

The seller might also specify that the buying cycle will last for 48 hours. That is, the number of purchase requests at the end of 48 hours will determine the price at which the item will be sold and no purchase requests will be accepted after 48 hours.

Next, if the time or date limit of the offers has not passed (block 32) the system displays the offer on one or more web sites (block 33). The display will have the elements of information shown in FIG. 2. A buyer who sees the offer on a web site can then indicate a desire to join the Buying Team for this offer by "clicking" button 28. At this point the buyer will provide billing and shipping information (unless it was previously provided during a registration process) and the buyer must indicate the amount of product desired (block 34). This is the individual buyer's "demand" level for this offer.

At this point the system checks (bock 35) to determine if the Buying Team's Aggregate Demand (which is calculated by summing all of the buyers' individual demand levels for this offer) is still less than the Maximum Available Amount previously specified by the seller (block 31). (If the seller did not specify a Maximum Available Amount, the system considers the Maximum Available Amount to be unlimited, and considers the answer to the question in block 35 to be "Yes". That is, the Aggregate Demand is assumed always to be less than the Maximum Available Amount if no Maximum Available Amount was specified.)

If the Buying Team's Aggregate Demand is less than the Maximum Available Amount (block 35) then the system goes back and checks if the time and date limits still have not passed (block 32). If the time or date limit still has not passed, the system continues to present the offer on one or more web sites (block 33).

If (at block 35) the Buying Team's Aggregate Demand is not less than the Maximum Available Amount—i.e. if all of the items have been sold—then the offer will be accepted (block 37), and buyers and sellers will be notified.

Note that, while FIG. 3 shows the system checking the time and date limits (block 32) after a buyer joins a Buying Group, the system will additionally regularly check the time and date limit (block 32), ideally checking every minute. (On computer operating systems and environments like Unix, windows NT, and Java, regular tasks like these can be performed using and independent software process or thread that runs in parallel with the rest of the system's processes or threads.)

Any time the system checks the offer's date or time limits (block 32), if the offer's date or time limit has passed (for example, if the seller specified that the offer must end by 2 pm Dec. 25, 1999, and that time and date have passed), then the system proceeds to check if any of the Demand Thresholds previously specified by the seller (block 31) have been met or exceeded by the Buying Team's Aggregate Demand (block 36). To do this, the system checks if the Aggregate Demand (which is the total amount of product all of the buyers in the Buying Group have, collectively, expressed a desire to buy) meets or exceeds the lowest Demand Threshold for the offer. In the soccer ball offer example above, the lowest Demand Threshold was 2. (The seller offered to sell 2–5 balls for $10.) So in that example, the system would check if all the buyers in the Buying Team collectively expressed a desire to buy, in aggregate, at least 2 balls.

If the Aggregate Demand does meet or exceed the lowest Demand Threshold (block 36) then the offer can be accepted (block 37) and the buyers and sellers are notified. Otherwise the offer is cancelled (block 38) due to insufficient demand, and the buyers and sellers are so notified.

In a situation where offers are accepted (block 37) the buyers' credit cards are charged, the product is shipped to the buyers, and commissions are calculated and paid. If for example the system is being operated by one entity and the products are actually being sold by a different entity, the system operator may receive a pre-negotiated commission and the actual seller will receive the remainder of the selling price.

Figure 4:
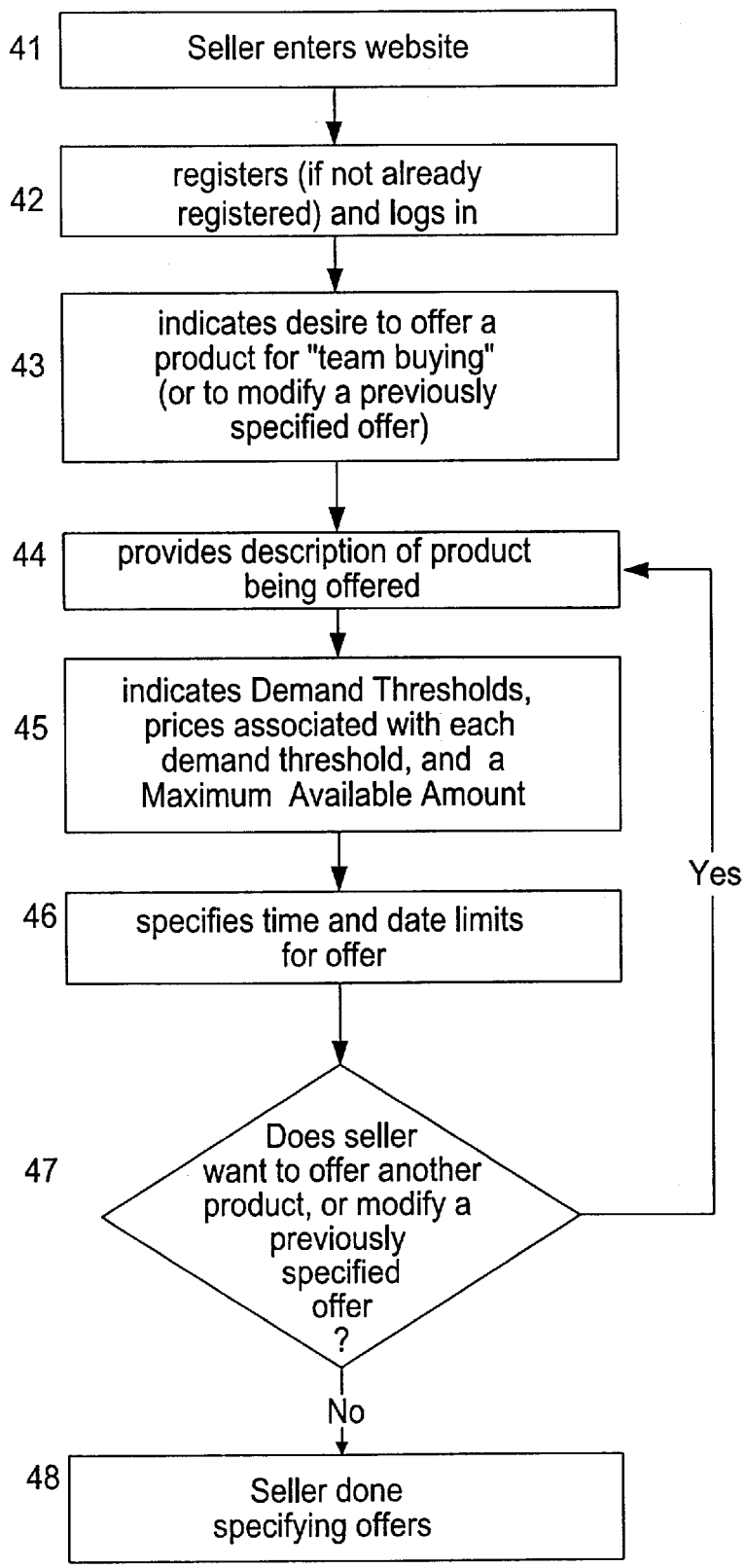
FIG. 4 is a program flow diagram of the a seller specifying an offer.
Figure 5:
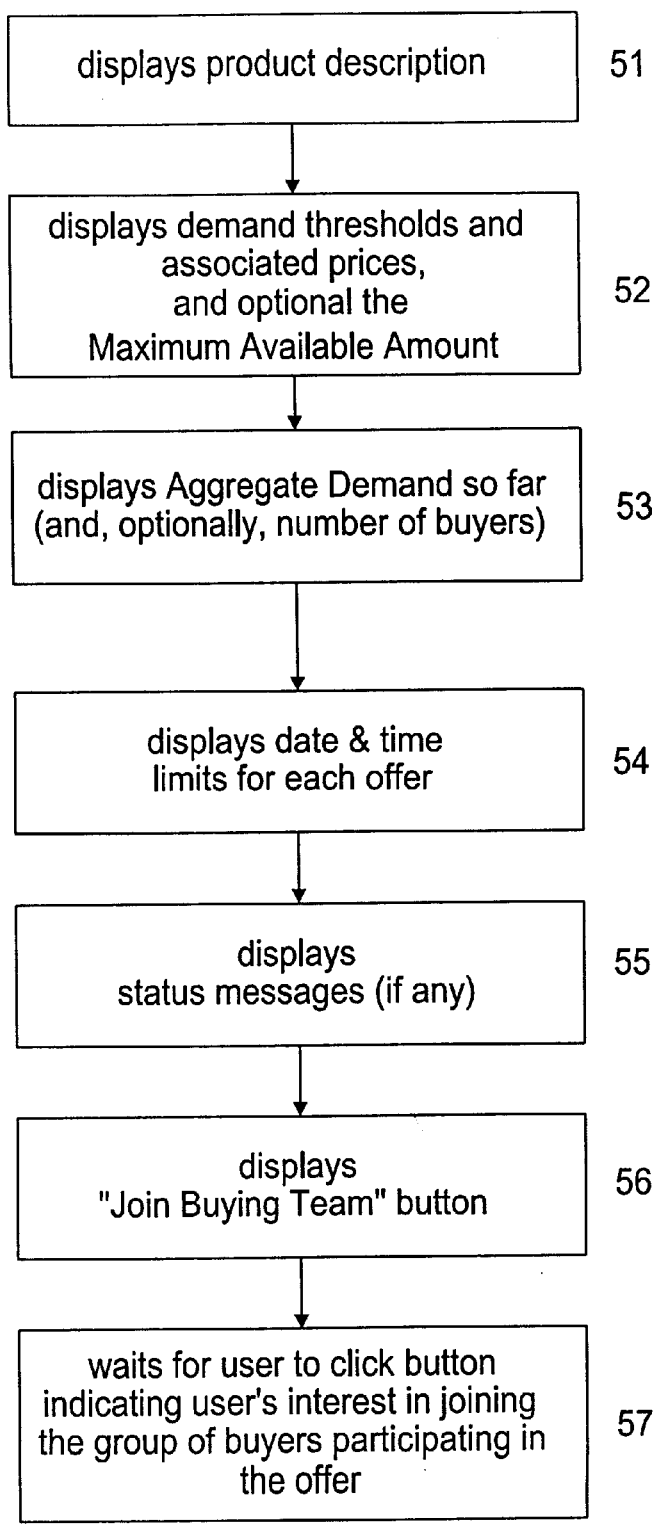
FIG. 5 is a program flow diagram of presenting offers on a web site.

Detailed program flow diagrams of the operations shown in FIG. 3 are given in FIGS. 4 to 8. FIG. 4 is a program flow diagram for the operation of the system as the seller specifies an offer to sell a product. After the seller enters the web site (block 41) the seller registers (block 42) if he has not previously registered. In order to register, the seller provides contact information and credit information (including social security or business ID), so that the system operator can verify the seller's authenticity and credit worthiness and (if the seller looks reliable) authorize the seller to have access to the system. The system operator will provide the seller with an ID and password so the seller can log into the system. In alternative embodiments, the system's controller 13 (i.e. the system's computer servers, database, and server software) can be set to automatically check the seller's credit history, and automatically generate the Seller's ID and password or let the seller create his or her own ID and password.

After the seller is registered, the seller logs into the system (block 42), using his or her ID and password, and indicates whether he or she would like to enter the specification for a Team Buy Offer (i.e. to offer one or more units of a product or service to one or more buyers), or modify the specification for a previously entered offer (block 43).

If the seller chooses to enter a new Group Buy offer or modify a previously entered one, the seller proceeds to enter a set of information that defines the offer.

The seller starts by entering (or modifying) a description of the offer (block 44). For example, the seller might provide text (or a recorded voice) saying, "200 Brand A widgets for sale". Next the seller specifies a Maximum Demand Threshold and a corresponding price (block 45). For example, the seller might indicate that a particular widget will be sold for $310 each if 200 can be sold during the offer. The seller can also specify additional lower Demand Thresholds and prices. For example, the seller could indicate that a particular widgets will be sold for $325 each if the Aggregate Demand is 100 or more units but less than 200 units. That is, if potential buyers wind up expressing a desire to buy (in aggregate) between 100 and 199 units, the seller will sell those units for $325 each, and if the potential buyers wind up expressing a desire to buy (in aggregate) 200 or more units, the seller will lower the per-unit price to $310 each. Finally a seller has the option of also indicating a Maximum Available Amount of product available for sale during the offer. For example, if the seller only has 300 units in inventory, the seller could set the Maximum Available Amount level to 300.

The seller also specifies a date and time limit for this offer (block 46). For example, the seller might indicate that if the lowest Demand Aggregation Threshold (100 units in the above example) is not met by noon on a certain date, the offer will be cancelled. The seller also has the option of not setting a date and time limit. However, providing a date and time limit gives buyers an incentive to act sooner, and makes it easy—automatic, in fact—for the seller to cancel the offer if there is not enough demand to satisfy the seller.

The seller can then choose to specify additional Group Buy Offers, or modify a previously specified offer (block 47). After the seller enters an offer to sell, the system 13 presents the offer on one or more web sites (block 33) until the date or time limit passes (block 32) or the Aggregate Demand rises to the Maximum Available Amount (block 35) specified by the seller (blocks 45 and 46), if one was specified. In the preferred embodiment, the system 13 presents one or more sellers' offers on one or more web sites with web pages similar to web page 21. The web pages are accessed by buyers 15 through terminals 14a to 14x.

Presenting an offer on a web site involves displaying several pieces of information associated with the offer. In the preferred embodiment, the system 13 presents offers on one or more web sites as in accordance with the program flow diagram shown in FIG. 5. For each offer presented, the system will display the following information as entered by the seller or as calculated by the system controller 13: the offered product's description (block 51); the Demand Thresholds and associated Prices (block 52) and the Maximum Available Amount (if one was specified by the seller); the Aggregate Demand so far (block 53)—i.e. the total amount that potential buyers have expressed an interest in buying (in aggregate) since the start of the offer; and optionally, the number of buyers in the Buying Group so far (block 53); the date and time limit for the offer (block 54) as entered by the seller (46); an optional status message (block 55) (e.g. "Just 2 days left! We need to sell twelve more units to get the best discount price!"); and a "Join Buy Team" button (block 56) that potential buyers can dick if they are interested in joining the buying group for this offer. In an alterative embodiment, potential buyers can click on another part of the screen displaying the offer to indicate their interest in participating in the offer. In such an embodiment, the "Join Buy Team" button would be optional. (The "Join Buy Team" button can also go by other names, such as "Buy Now" or simply "Buy".)

Figure 6:
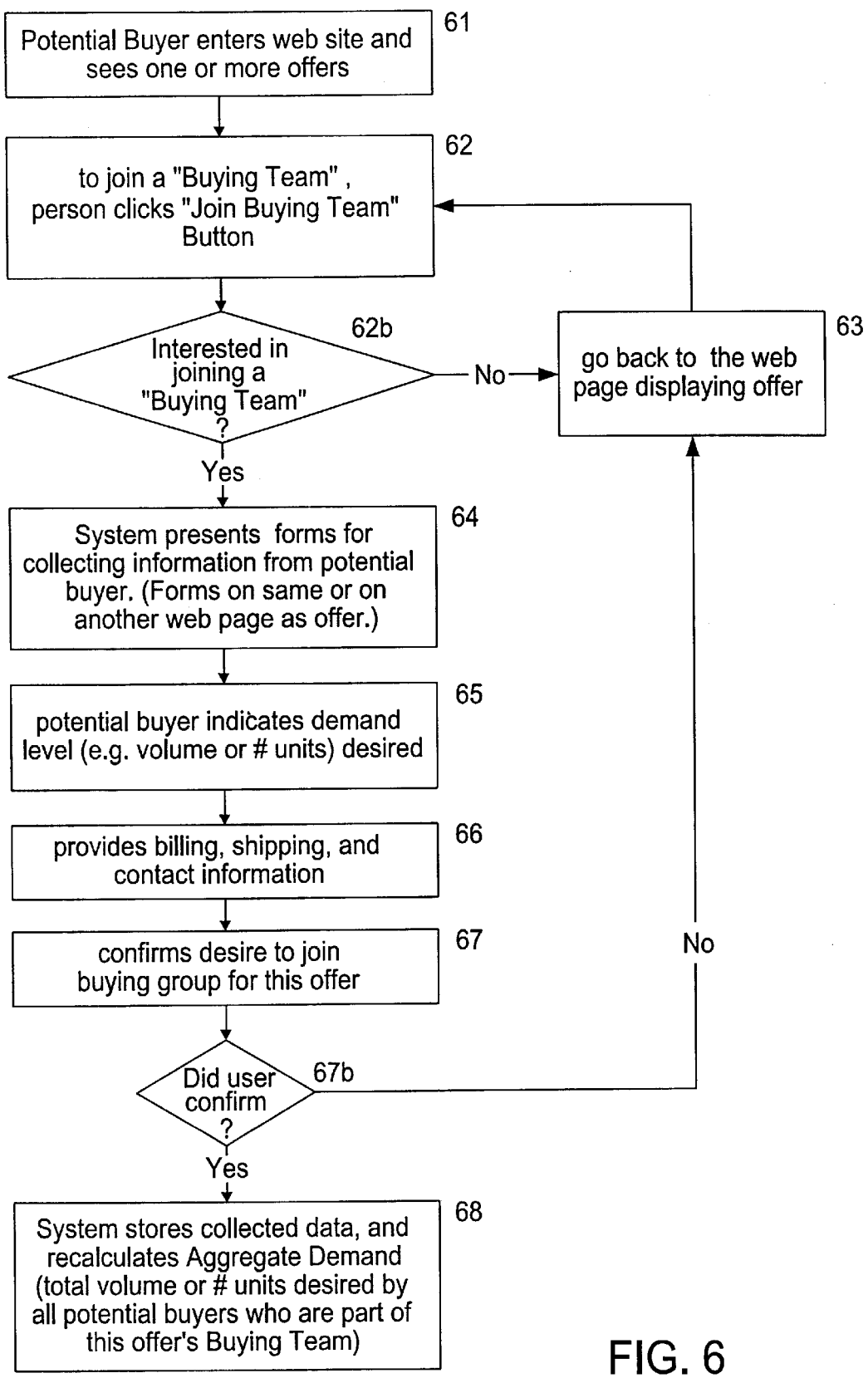
FIG. 6 is a program flow diagram of a buyer joining a buying group.

FIG. 6 is a program flow diagram of the operations that occur when a potential buyer joins a buying team (Block 34). If a potential buyer sees an offer displayed on a web site (block 61), and wants to participate in the offer, the potential buyer can indicate a desire to join a Buying Group (62 and 62b) by clicking on the "Join Buy Team" button. In that case, the system proceeds to walk the potential buyer through the process of signing up to join the Buying Group for this offer (also known as the "Buying Team" in this document).

The system will present forms (block 64) to collect information from the potential buyer, presenting the forms either on the same web page where the offer was presented or on separate web pages linked to that first web page. The buyer enters the amount (e.g. the volume or number of units) they are interested in buying if this offer goes through (block 65). This is the potential buyer's individual "demand" level. For example, if the offer is for soccer balls, the user might indicate an interest in buying 5 balls. The potential buyer also provides his or her billing information (for example, credit card number and expiration date and billing address), shipping address, and contact information (block 66). Preferably an e-mail address is provided as part of the contact information. The potential buyer then gets a chance to confirm whether he or she really wants to join the Buying Group after all (block 67).

When the potential buyer confirms his or her interest in joining the Buying Group (block 67b), then the system stores the collected data in a central database (part of the software on the servers 13) and the system recalculates the Aggregate Demand for this offer (block 68). The Aggregate Demand is the sum of each Buying Group member's individual demand level. For example, if there are three members in a Buying Group so far for the Soccer Ball example mentioned earlier, with the first expressing an interest in buying 5 balls, the second indicating an interest in buying 1 ball, and third indicating an interest in buying 20 balls, then the Aggregate Demand so far is 5+1+20=26 balls. If the seller is selling wheat instead of soccer balls, then the Aggregate Demand might be expressed in lbs. of wheat instead of # of balls. Likewise the demand could be in terms of hours of a particular service that is being offered.

The system will not allow a buyer to request more units than are available—i.e. more units than the Maximum Available Amount specified by the seller, factoring in the Aggregate Demand already expressed by other Buying Group members plus the number of units requested by the new potential buyer. If the new potential buyer requests too many units, the system will display a message on the web site telling the new potential buyer how many units are left, and then allow the new potential buyer to re-enter a lower desired number of units (block 65). Naturally in some situations a seller might have a virtually unlimited number of units available if at least a certain number of products are ordered.

As described earlier, and as indicated by blocks 32, 35, and 36, the system monitors aggregate demand, and time and date limits, during each offer's buying cycle. If the Buying Team's Aggregate Demand rises to the Maximum Available Amount (block 35) for an offer, or if the time or date limit has passed (block 32) but Aggregate Demand has risen to at least the lowest Demand Threshold (36) by that time, then the system proceeds to the "Offer Accepted" stage (block 37). However, if the time and date threshold pass (block 32), and the Aggregate Demand is still below the lowest Demand Threshold (block 36) at that time, then the system proceeds to the "Offer Cancelled" stage (block 38).

For example, suppose a seller offered 250–499 soccer balls for $15 each or 500–700 soccer balls for $10 each, with a Maximum Available Amount of 700. If the Aggregate Demand (that is, the total number of balls collectively desired by all members of this offer's Buying Group) reaches 700 (the Maximum Available Amount) before the Date & Time limit pass, the system would recognize that (block 35) and proceed to the "Offer Accepted" stage (block 37), If the Date & Time limits pass (block 32) and the Aggregate Demand has reached 265 (higher than the lowest Demand Threshold of 250), then the system would recognize that (block 36) and also proceed to the "Offer Accepted" stage (block 37). But if the Date & Time limits pass (block 32) and the Aggregate Demand has only reached 112 balls by then (less than the lowest Demand Threshold of 250), then the system would recognize that (block 36) and proceed to the "Offer Cancelled" stage (block 38).

Figure 7:
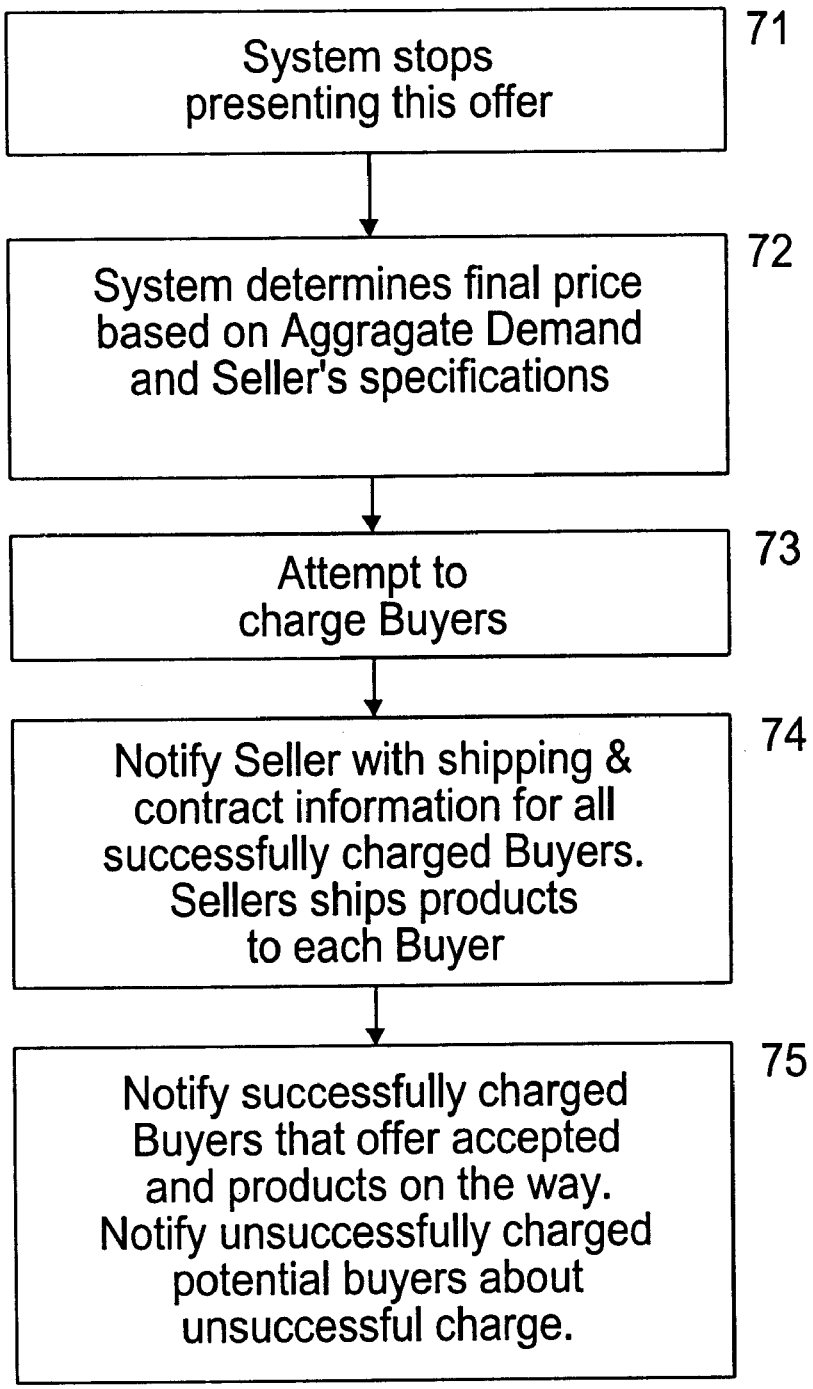
FIG. 7 is a program flow diagram of a offer being accepted.
Figure 8:
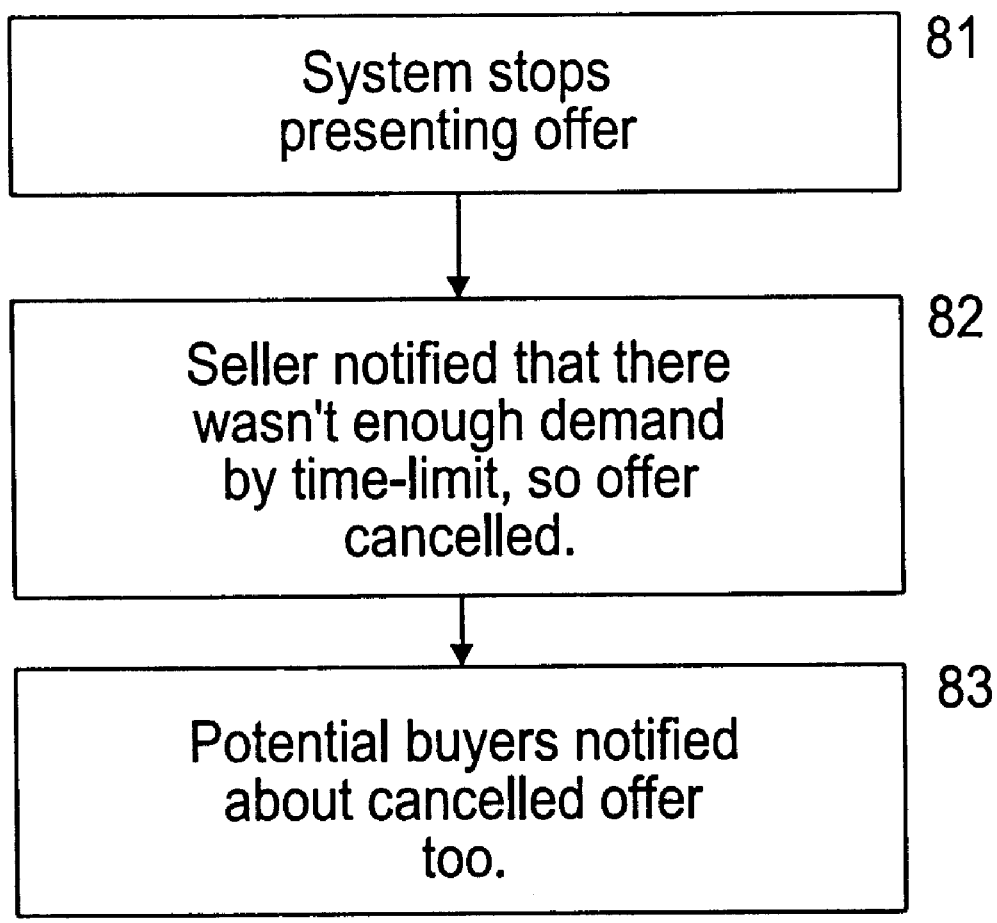
FIG. 8 is a program flow diagram of an offer being cancelled.

In the "Offer Accepted" processing stage (the programming block diagram of which is shown in FIG. 7), the system first stops presenting the offer (block 71) anywhere it had been presenting the offer. The system displays a message on those web sites indicating that the offer had been completed successfully.

The system then uses the Aggregate Demand (calculated at block 68), and the set of Demand Thresholds and associated prices provided by the seller when setting up the offer (block 31), to determine the final price each buyer will have to pay for the product being offered (block 72).

For example, if a seller offered 250–499 soccer balls for $15 each or 500–700 soccer balls for $10 each, and if the Buying Group members express a desire to buy (in aggregate) 272 soccer balls (i.e. their Aggregate Demand is 272), then the price they would have to pay would be $15 per ball. But if the Aggregate Demand by the end of the offer period met or exceeded 500 units, they would only have to pay $10 per ball.

After determining the final price (block 72), each potential buyer is charged (block 73) using the credit card information previously supplied by each buyer (block 66). Each buyer is charged the price times the number of units they are buying (as they indicated previously in block 65), plus any applicable tax and shipping & handling charge (if any). The system keeps track of which buyers were successfully charged. In some cases, credit card charges may not go through—for example, if a potential buyer's credit card has expired or is over its credit limit. In alternative embodiments, the system can automatically create invoices for buyers who prefer to be billed rather than paying by credit card.

The system notifies the seller that the offer has gone through, and provides the shipping and contact information for each successfully charged Buyer (block 74). The seller then ships the number of units requested by each successfully charged buyer (block 65) to that buyer. In alternative embodiments, the Seller could ship all of the units, in bulk, to a fulfillment company or to the System operator, who would handle shipping subsets of the units to individual Buyers.

In the case where the thing being purchased is a service, rather than a product, the seller would perform the purchased service for the buyer, rather than shipping any product.

Finally, successfully charged buyers are notified that the offer has been accepted, that they have been charged, and that the products are on their way (block 75). Potential buyers who were not successfully charged are notified (block 75) about the unsuccessful charge and no product is shipped to them.

As described above, if an offer's Time & Date limit passes (block 32) and Aggregate Demand is still below the lowest Demand Threshold (block 36), then the system proceeds to the "Offer Cancelled" processing stage (block 38). When this occurs, the system stops presenting the offer (block 81) anywhere it had been presenting the offer. The system can display a message on those web sites indicating that the offer has been cancelled. The seller is notified that the offer has been cancelled because of insufficient demand (block 82). Finally, potential buyers who had expressed interest in joining the Buying Group for this offer are notified that the offer has been cancelled because of insufficient demand (block 83).

The embodiment illustrated in FIG. 1 displays the offers on a web site run by the System Operator on a web server that is part of the system controller 13. For example, if XYZ Corp. wanted to offer group discounts on their own web site, using their own software to manage the process, they would implement a system like the one illustrated in FIG. 1. The embodiment shown in FIG. 1 could also be used to display offers on more than one web site hosted on the same servers used for the system controller 13.

Figure 9:
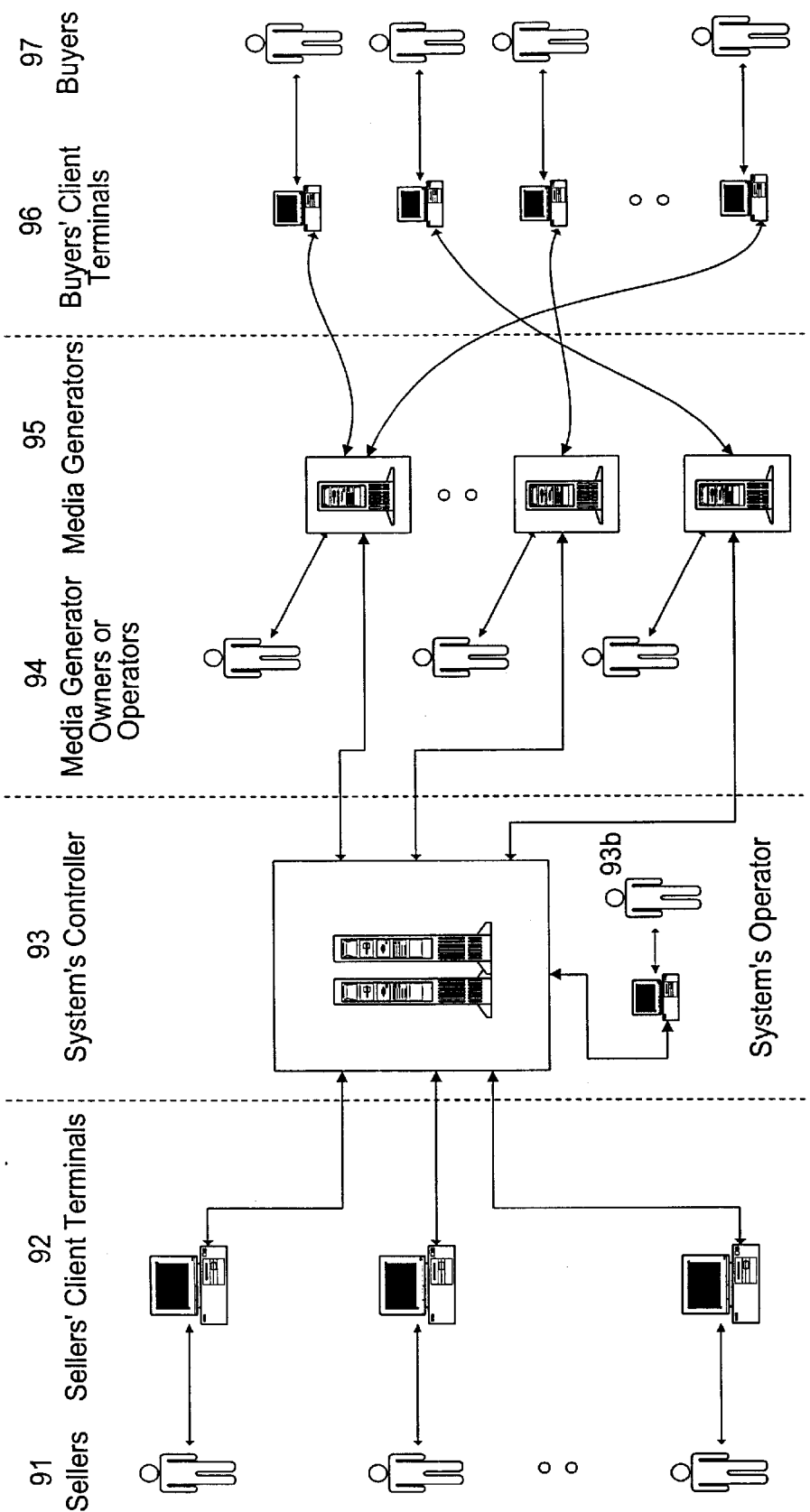
FIG. 9 is an overall diagram of an alternative embodiment.

Various other alternative embodiments of the invention are possible. FIG. 9 illustrates one alternative embodiment of the invention. FIG. 9 illustrates an embodiment of the system that displays offers on one or more web sites (usually more than one) run by other web-site operators who may differ from the System Operator, on web servers that are not part of the system controller 13.

For example, if ABC Corp. wants to present Group Buy offers on a network of affiliate web-sites (BBB Corp. site, CCC Corp. site, and others), ABC Corp. would use the embodiment shown in FIG. 9. The embodiment shown in FIG. 9 includes an extra layer of external web-sites and web-site operators. This embodiment can be used to display offers on one or more (i.e. multiple) web-sites 95 (generically referred to herein as media generators) run by parties 94 other than the System Operator 93b. Thus, four different parties can be involved in each potential sale. There is a seller 91, a System Operator 93b, a web site operator 94, and a buyer 97.

If the parties are all distinct from one another, the System Operator 93b and each Media Generator Operator 94 will (in a preferred version of this embodiment) receive a commission or royalty on each sale facilitated through each Media Generator Operator's web site 95. Using the above example, ABC Corp. could create a Group Buy offer for a certain product, using a system like the one illustrated in FIG. 9 (operated by a potentially unrelated Operator 93b) to present those offers on multiple affiliate web sites including BBB Corp.'s web site and CCC Corp.'s web site. If enough demand is aggregated in time for that Group Buy offer to be accepted, then the System's Controller 93 will charge the buyers (including shipping and sales tax), pay BBB Corp. and CCC Corp. a commission based on the number of items sold through their respective web sites during this offer and the price of those items (or a fixed amount per item), retain another commission for the System's Operator 93b based on the total number of items sold through this offer and the price of those items (or a fixed amount per item), and pay the Seller 91 the remainder.

Naturally while all the different parties may be unrelated, in some situations some of the parties may be somehow related or in fact may by the same entity. One important example would be a Seller who wants to offer Group Buy offers through its own web sites, using a System Controller 93 that is run by an outside System Operator 93b. In this case the Media Generator Operator 94 and the Seller 91 are the same entity. The System's Operator 93b is a separate entity, offering its services (the ability to run Group Buy offers) to the Seller. In this case, when offers are accepted, the System's Controller 93 would simply retain a commission for the System's Operator 93b, and pay the Seller the remainder (rather than having to pay an additional commission to unrelated Media Generator Operators).

The embodiment shown in FIG. 9 includes media generators 95 and media generator owners or operators 94. In this embodiment sellers 91, sellers terminals 92 system controller 93 and buyer's terminals 96 are similar to the corresponding elements shown in FIG. 1.

Media generators 95 are conventional internet web-server (s) that accept information from system controller 93 and respond by displaying one or more of sellers' offers on some part of a web site (where display can change for each viewer over time), and by accepting input from buyers who may respond to those offers. The media generator owners or operators 94 are web-site owners or operators who choose to have system controller 93 present offers and accept buyer responses through parts of their web sites. The media generators 95 are run by one or more operators 94. One or more potential buyers 97 can then view the offers on the web sites using their web browsers (96). In the preferred embodiment, either the seller 91 or the System Operator 93b or the operators 94 of the media generators 95 can configure the system to display either all offers currently being managed by the system controller 93 or some subset of those offers.

In other alternative embodiments, the offers can be displayed on various kinds of "media generators" 95 besides standard web sites—media generators being interactive presentation devices like hand-held devices, interactive television, cell phones, and so on.

In one alternative embodiment, the system periodically checks If an offer's time and date limit is near. If it is, and if there are almost enough potential buyers to reach the next Demand Threshold for the offer, then the system automatically notifies the current Buying Group members that they should tell their friends and family about the offer in order to get more Buyers to join the Buying Group. For example, the system could e-mail a message stating something like, "We just need 5 more people to join the Buying Team in order to get the Soccer Balls for only $10 each.. Tell your friends!". This information can also be displayed on any web page where the offer is displayed, and the system can also display a "Tell your friends" button next to a box where people can type their friends email addresses. When the button is clicked, the friends are sent an email message telling them about the offer and telling them how to join the Buying Group.

The preferred embodiment of this invention described above allows one or more sellers to present one or more Team Buy offers to one or more potential buyers through one or more web sites. An alterative embodiment will be a simpler embodiment in which a single seller offers a volume discount on one product to one or more buyers through the seller's own web site. For example, an online retailer company (hereinafter referred to as XXE) could use this simpler embodiment of this invention to offer a volume discount on XXE's own web sites using the system of the present invention to present the offer. For example XXE could offer a toy with the description "Mr. XYZ at half off if we sell 200 units by Tuesday!". A system in accordance with the present invention would automatically accept indications of interest (i.e. aggregate demand) from one or more people who are interested in joining the Buying Group for that offer.

Other embodiments of the invention could also allow sellers or the system operator 13*b* to place more constraints on the offers. For example, they might place a limit on how many units any single buyer can request. For example, a soccer ball retailer who is offering a great deal on soccer balls in order to attract new customers might limit potential buyers to 2 balls each, so as to attract many new customers, rather than allowing just one or two customers to buy all of the soccer balls at the great price.

In still other embodiments of this invention, sellers could specify different types of thresholds. For example, sellers could offer a special price if enough people agree to purchase exactly 500 units (in aggregate) of a given item (e.g. because the seller has exactly 500 units to sell). Or they could offer a special price if potential buyers agree to purchase at least 500 units (in aggregate) if the deal goes through (e.g. because the seller has more than 500 units available for sale).

Another embodiment of the present invention allows sellers to set both a minimum number of buyers as well as a minimum volume of goods or services sold, and allows the seller to set limits on the amount any one buyer could buy for a given offer. For example, a seller might offer 500 computer modems, and specify "maximum of two modems per person". Alternatively a seller might offer 300 passes to an amusement park, requiring 300 individual buyers (rather than allowing more than one pass per any given buyer). In another alternative a seller might offer 200 modems to up to 100 buyers (either without specific restrictions on the number each buyer could buy, or with a limit of, say, up to 5 modems each).

Still other embodiments of the present invention can allow sellers to offer services as well as goods. For example, "I'll wash 100 cars for $5 each." or "Our law firm will do incorporation work for 200 companies, at only $1000 per company".

In yet another embodiment, the system could allow buyers to express an interest that is conditional. That is, the system can allow a buyer to specify that the buyer will buy the product only if the demand is sufficient to lower the price to a particular level. In such an embodiment, the system would have a "buy button" as shown in FIG. 2 and one or more additional buttons that would allow a potential buyer to indicate that the order being placed is conditional upon the price reaching a particular level associated with the particular button.

The method and apparatus of the present invention have applications on the Internet as well as in conventional communications systems such as voice telephony and other communications systems such as two-way television (a.k.a. interactive television) and WebTVs. Any device that can present information (visually, audibly, or otherwise) can be used to present offers. Any device that can accept input from people (directly or indirectly through other devices) can be used to accept indications of interest.

The preferred embodiments of this invention utilize the internet and standard computer tools used to build high-scale Internet-based services that include financial transactions.

Several companies, including Microsoft Corporation, Netscape Communications, and Oracle, provide commercially available tools and documentation that are frequently used by programmers to implement high-scale web applications. A skilled programmer with access to these tools and documentation could follow the specifications described herein and build a system that utilizes the present invention.

The term "system operator" as used herein does not necessarily refer to an individual. The term refers to and entity or enterprise (which could be an individual) who operates the System Controller 13 (or 93) that accepts orders and makes the previously described calculations. In the embodiment shown in FIG. 1, the system operator's server also hosts the web pages that are viewed by potential buyers. In the embodiment shown in FIG. 9, the web pages viewed by potential buyers are hosted on servers that can be owned an operated by individuals or entities that differ from the entity that owns or operates the server that hosts the controller 93.

The products offered for sale using the various embodiments of the invention can be products that are offered for sale by the System Operator. Alternatively, the System Operator can merely provide facility that is used by others to offer products for sale. If it is the System Operator that is offering products for sale, when an offer is accepted, the System Operator (or an agent of the System Operator) will ship the product to the buyer. If the System Operator is merely providing a facility for others to offer products for sale, when an offer is accepted, the product will typically be shipped to the Buyer by the actual Seller (or by an agent for the Seller). In such a case the System Operator will only receive a commission for operating the system and the remainder of the purchase price will go to the actual Seller.

In the embodiments thus far described, the buyers are charged by means of a credit card. Other alternative methods of payment can also be used. For example, the seller could invoice the buyer, or potential buyers could be required to maintain a deposit account with the system operator. In yet other embodiments, various other payment mechanisms could be employed.

The System Operator can be an entrepreneur who owns and operates a computer system and business that allows sellers to display conditional offers to buyers and which handles the associated computations and data base operations. Alternately, the System Operator may be an entrepreneur who merely conducts the business operations and who rents space on a computer or web server owned by another party who handles the computer operations for the business. The term System Operator is herein used to refer to the person, company or entrepreneur responsible for the overall operation of the system irrespective of whether or not the System Operator owns and operates system controller 13 (or 93) or if there is some other the business relationship between the entrepreneur responsible for the system and the party or entity that owns or operates the actual computer systems and web servers that provide the functions of system controller 13 or 93.

It is also noted that in the embodiment shown in FIG. 1, the system controller 13 consists of server hardware running database software, software for performing the logic in FIGS. 3 to 8, and web server software for hosting one or more web sites. In the embodiment shown in FIG. 9, the system Controller 93 includes the hardware, database software, and software to perform the described logical operations, but (as illustrated) it does not necessarily include web server software. Instead as illustrated in FIG. 9, the system controller 93 communicates with outside server hardware 95 that runs web server software. It is however noted that, optionally, one or more of the media generators 95 could in fact be in the same physical hardware as the system controller 93.

It should be understood that while various preferred embodiments of the invention have been described, those skilled in the art could make various changes in form and detail without departing from the spirit and scope of the invention. Applicant's invention is limited only by the scope of the appended claims.

I claim:

1. A system for aggregating demand for the purchase of at least one product by a plurality of individual buyers comprising:

a controller;

seller terminals which communicate with said controller whereby sellers can enter and transmit, prior to the beginning of a specified and limited time period, to said controller, a conditional sales offer for said at least one product, said conditional sales offer specifying prices which are dependent upon the total number of said at least one product associated with said conditional sales offer purchased in the specified and limited time period;

web pages which display said conditional sales offer;

a plurality of individual buyer terminals which communicate with said controller whereby said plurality of individual buyers can indicate to said controller an acceptance of said conditional sales offer for the at least one product, and;

said controller calculating the price from among the specified prices for said at least one product dependent upon said conditional sales offer and an aggregate amount of said at least one product that said plurality of individual buyers have collectively indicated a willingness to purchase during said specified and limited time period.

2. The system recited in claim 1 operating in accordance with said specified and limited time period whereby orders for a particular product are only accepted for said specified and limited time period.

3. The system recited in claim 1 wherein said system makes available said conditional sales offer to a plurality of web sites.

4. The system recited in claim 1 wherein said seller terminals are terminals connected to the Internet.

5. The system recited in claim 1 where said conditional sales offer includes different prices for different quantities of products.

6. The system recited in claim 1 wherein said controller comprises a server.

7. The system recited in claim 1 wherein said seller terminals and said plurality of individual potential buyer terminals communicate with said controller via the Internet.

8. A method for marketing at least one product to a plurality of individual buyers that operates in accordance with a specified and limited time period, said method comprising the steps of:

receiving, prior to the beginning of a specified and limited time period, from sellers at a controller, connected to a network, a conditional sales offer for said at least one product, said conditional sales offer specifying prices which are dependent upon the total number of said at least one product associated with the respective conditional sales offer purchased in said specified and limited time period;

providing said plurality of individual potential buyers with said conditional sales offer for said at least one product through said network;

receiving from said plurality of individual potential buyers at the controller an indication of an acceptance of said conditional sales offer for said at least one product;

said controller calculating a price from among the specified prices for said at least one product dependent upon the conditional sales offer and an aggregate amount of said at least one product that said plurality of individual potential buyers have collectively indicated a willingness to purchase in said specified and limited time period; and communicating to said plurality of individual potential buyers and said sellers the price of said at least one product at the end of said specified and limited time period.

9. The method recited in claim 8 wherein a system operator provides a system for communicating conditional sales offers from said sellers to said plurality of individual potential buyers.

10. The method recited in claim 9 wherein the system operator receives a commission on the price paid by said plurality of individual potential buyers to said sellers.

11. The method of claim 9 wherein said conditional sales offer is displayed on web sites operated by site operators, and wherein said system operator and said site operators receive a commission on the price paid by said plurality of individual potential buyers to said sellers.

* * * * *

UNITED STATES PATENT AND TRADEMARK OFFICE
CERTIFICATE OF CORRECTION

PATENT NO. : 6,269,343 B1
DATED : July 31, 2001
INVENTOR(S) : Pallakoff

It is certified that error appears in the above-identified patent and that said Letters Patent is hereby corrected as shown below:

Column 1,
Line 14, change "intermet" to -- internet --.
Line 31, change "made" to -- make --.
Line 64, change "therefor" to -- therefore --.

Column 2,
Line 7, delete "the" which is followed by "a seller".
Line 13, change "a" to -- an --.

Column 3,
Line 1, change "intemet" to -- internet --.

Column 4,
Line 20, change "FIGS" to -- FIG --.

Column 6,
Line 15, change "widgets" to -- widget --.

Column 10,
Line 18, change "intermet" to -- internet --.

Column 11,
Line 63, change "intermet" to -- internet --.
Line 64, change "intermet" to -- internet --.

Column 12,
Line 41, change "Altemately" to -- Alternately --.

Signed and Sealed this

Twelfth Day of March, 2002

Attest:

JAMES E. ROGAN
*Attesting Officer*   *Director of the United States Patent and Trademark Office*